United States Patent [19]

Truglio

[11] Patent Number: 4,528,187
[45] Date of Patent: Jul. 9, 1985

[54] APPARATUS FOR COLLECTING AND MICROSCOPICALLY EXAMINING A SPECIMEN

[76] Inventor: William J. Truglio, 22 Palmer Dr., Sayville, N.Y. 11782

[21] Appl. No.: 553,130

[22] Filed: Nov. 18, 1983

Related U.S. Application Data

[63] Continuation-in-part of Ser. No. 357,759, Mar. 12, 1982, Pat. No. 4,427,634.

[51] Int. Cl.³ .......................... B01L 3/00; G01N 1/28
[52] U.S. Cl. .................................... 422/102; 356/246; 422/99
[58] Field of Search .................. 350/536; 422/99, 101, 422/102; 435/292, 294, 295, 296, 297; 356/244, 246

[56] References Cited

U.S. PATENT DOCUMENTS

| | | | |
|---|---|---|---|
| 3,027,799 | 4/1962 | Weichselbaum | 356/246 |
| 3,814,522 | 6/1974 | Clark et al. | 422/102 |
| 4,066,414 | 1/1978 | Selby | 422/102 |
| 4,308,028 | 12/1981 | Elkins | 422/101 |
| 4,427,634 | 1/1984 | Truglio | 422/99 |

OTHER PUBLICATIONS

"Developments", Cole-Parmer Instrument and Equipment Co., Chicago, Sep., 1957, p. 10.

Primary Examiner—Hiram H. Bernstein
Assistant Examiner—Carol M. Delahunty
Attorney, Agent, or Firm—Edward H. Loveman

[57] ABSTRACT

This apparatus involves an assembly of a test tube and paddle insert. The tube has a frustoconical body and a tapered tip in which is a well, having opposed tapered wide flat walls and narrow walls. The paddle insert has a long handle integral with a transparent tapered paddle head that is shorter than the tapered well in which the paddle head seats. Flexible fingers extend away from the head to frictionally engage the narrow walls of the well and prevent the paddle from falling out of the tube when the tube is inverted or tipped. A ridge on the edges of the side walls and the back of the paddle head retains a specimen in a narrow chamber defined between adjacent walls of the tube tip, the paddle head and the ridge for microscopic examination thereof.

7 Claims, 12 Drawing Figures

APPARATUS FOR COLLECTING AND MICROSCOPICALLY EXAMINING A SPECIMEN

This application is a continuation-in-part of my copending U.S. patent application, Ser. No. 357,759, filed Mar. 12, 1982, now U.S. Pat. No. 4,427,634, and entitled "Apparatus for Microscopic Examination of a Specimen".

This invention relates to apparatus for collecting, retaining, and microscopically examining a specimen, and more particularly concerns an assembly of apparatus adapted to serve as a container for the specimen, and as a slide for microscopically examining the specimen, said assembly including a novel form of test tube and paddle insert, both especially adapted for collecting and retaining a specimen more efficiently than has been possible heretofore.

Test tubes of conventional type heretofore used in laboratory procedure are generally made of transparent glass or plastic material and are cylindrical with spherically curved closed bottom and open top. When used for urinalysis it has been conventional to fill such a test tube 75% full with a urine sample. The test tube is then placed in a centrifuge for a predetermined time so that the sediment therein collects at the bottom of the tube. Almost all the fluid is then spilled out of the tube leaving $\frac{1}{4}$ to $\frac{1}{2}$ of a milliliter sediment in the tube. The tube is then tapped around its sides to remix the liquid and sediment. A drop of the mixture is then poured out of the tube upon a glass or plastic base slide. Alternatively, a small quantity of the mixture is removed from the tube by a pipette and a drop is placed on the slide. In either case, a cover plate or slide is then placed over the base slide to spread the sediment uniformly. Then the assembly of slides is placed on or in a microscope for examination.

The above conventional procedure has several disadvantages. If the sample contains disease causing bacteria or viruses there is great danger that personnel handling the specimen may come in contact with it. Moreover, the sample can spill onto their hands or their clothes, laboratory furniture and equipment. Even the microscope itself can become contaminated by leakage of the sample between the slides.

It has been proposed heretofore in my prior application above mentioned, to provide a cylindrical transparent test tube terminating in a flattened tip with parallel sides to collect a specimen for microscopic examination while in the tip of the tube. To assist in capturing the specimen it was proposed to provide a transparent paddle insert with a head having flat parallel sides. The paddle head is inserted into the well defined by the flat sides of the tube tip. Microscopic examination of the specimen held between adjacent walls of the tube tip and paddle head is then performed by placing the tube containing the paddle head in a microscope.

The present invention is directed at improving the efficiency of specimen collection so that a better sample of the fluid being examined is captured by the tube tip and paddle head. According to the invention, there is now provided a transparent, conical test tube having a tapered, flattened tip defining a well with tapered opposite walls. The well receives the transparent head of a paddle insert which has tapered opposite walls conforming to the tapered walls of the tube well. A ridge extends along the rear and the two lateral edges of the side walls to define a shallow recess. The ends of the side walls of the paddle head are smooth. This facilitates entry of a specimen into the recesses where it is captured by the ridge. Inclined, flexible tips project rearwardly or upwardly from the paddle head for frictionally engaging opposite narrow walls of the well, to prevent the paddle head from falling out of the well when the tube is inverted or tipped. By this arrangement, valuable casts and/or sediments which might be lost or overlooked when the prior apparatus is used, are now effectively and efficiently captured and held for microscopic examination.

In use, the new test tube containing a liquid to be examined is centrifuged to collect sediment and casings in the tube tip. The paddle insert is introduced axially into the tube with the paddle head just entering into the well and held therein and stopped by a fixed stop engaged on the rim of the test tube. Then the tube is inverted and excess liquid is poured off leaving a fixed amount of liquid and sediment in the well. The insert is prevented from leaving the well by the frictional engagement between the walls of the tube and a pair of inclined flexible tips. Thereafter the paddle insert stop is disengaged from the rim of the test tube and the paddle insert snugly fitted into the tube. The thickness of the ridges on the paddle head is about 3 mils. Thus, very thin films of sediment and liquid are captured on the walls of the paddle head in the recesses between the paddle head and adjacent walls of the well which serve as transparent covers or slides for the specimen. The test tube may then be placed in or on a microscope for examination of the casts and/or sediments trapped on the walls of the paddle head. This contrasts with the prior apparatus described in the application referred to above, where the sediment collects in spaces between parallel flat walls of the paddle head and parallel flat walls of the tube tip, but where the paddle head is capable of lateral movement so that the spacing between paddle head and walls of the tube well is not fixed, and where there is nothing to prevent leakage of the specimens off the paddle head.

It is therefore a principal object of the present invention to provide an improved assembly of test tube and paddle insert for collecting, supporting, and retaining a specimen to be examined in a microscope.

A further object of the present invention is to provide an assembly including a transparent test tube having a frustoconical body terminating in a tapered closed tip or end defining a well with tapered side walls, and paddle insert having a handle and a transparent paddle head with tapered side walls formed with ridges defining recesses in which the specimen to be examined is captured more effectively than has been heretofore possible.

A further object of the present invention is to provide an assembly as described wherein the paddle has flexible, flaring tips which engage opposite lateral walls of the tube well for holding the paddle head in place in the tube well with specimen captured in the recesses closed by adjacent walls of the tube well when the tube is inverted or tipped.

These and other objects and many of the attendant advantages of this invention will be readily appreciated as the same becomes better understood by reference to the following detailed description when considered in connection with the accompanying drawings in which.

Figure 1:
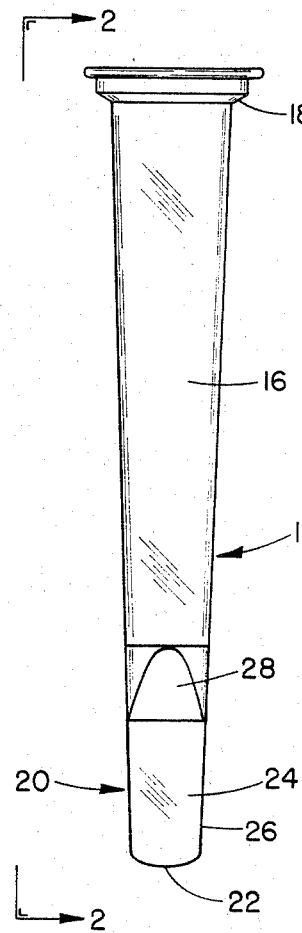
FIG. 1 is a front elevational view of the test tube per se, according to the invention.
Figure 2:
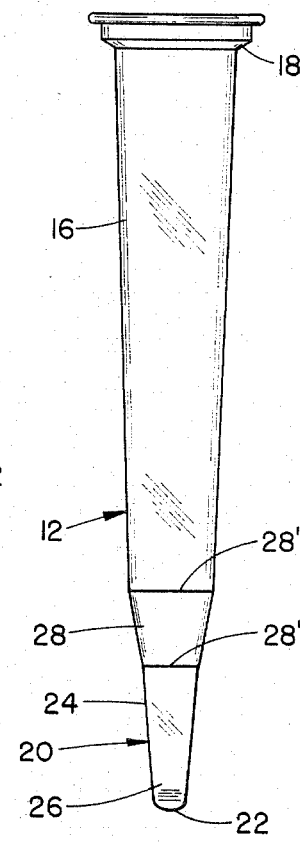
FIG. 2 is a side elevational view of the test tube taken along line 2—2 of FIG. 1.
Figure 3:
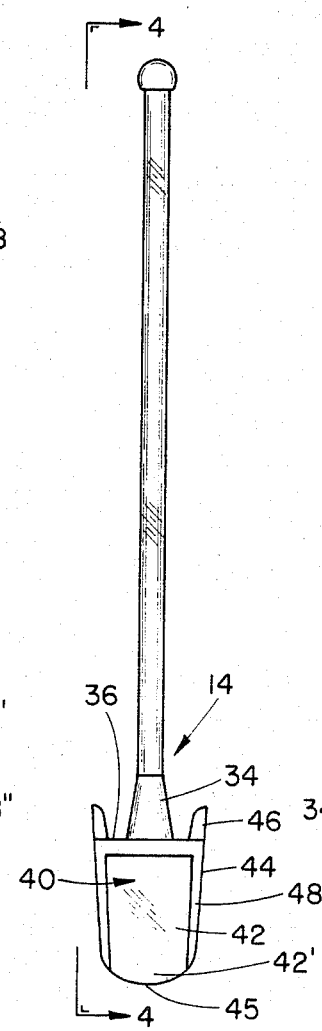
FIG. 3 is a front elevational view of the paddle insert per se.
Figure 4:
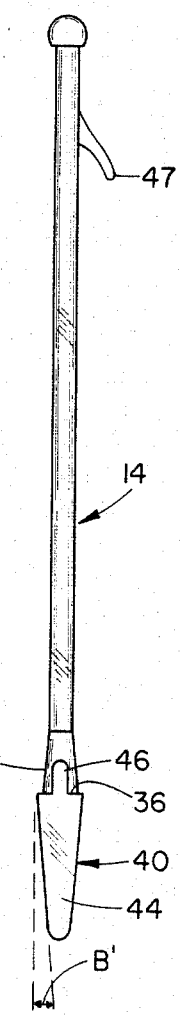
FIG. 4 is a side elevational view taken along line 4—4 of FIG. 3.
Figure 5:
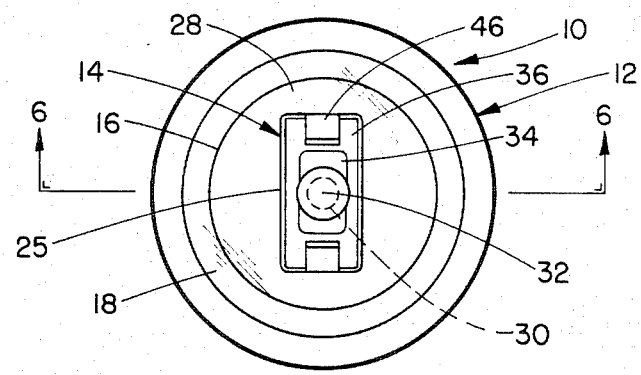
FIG. 5 is an enlarged top plan view of the entire assembly according to the invention with paddle fully inserted in the test tube.
Figures 6, 7:
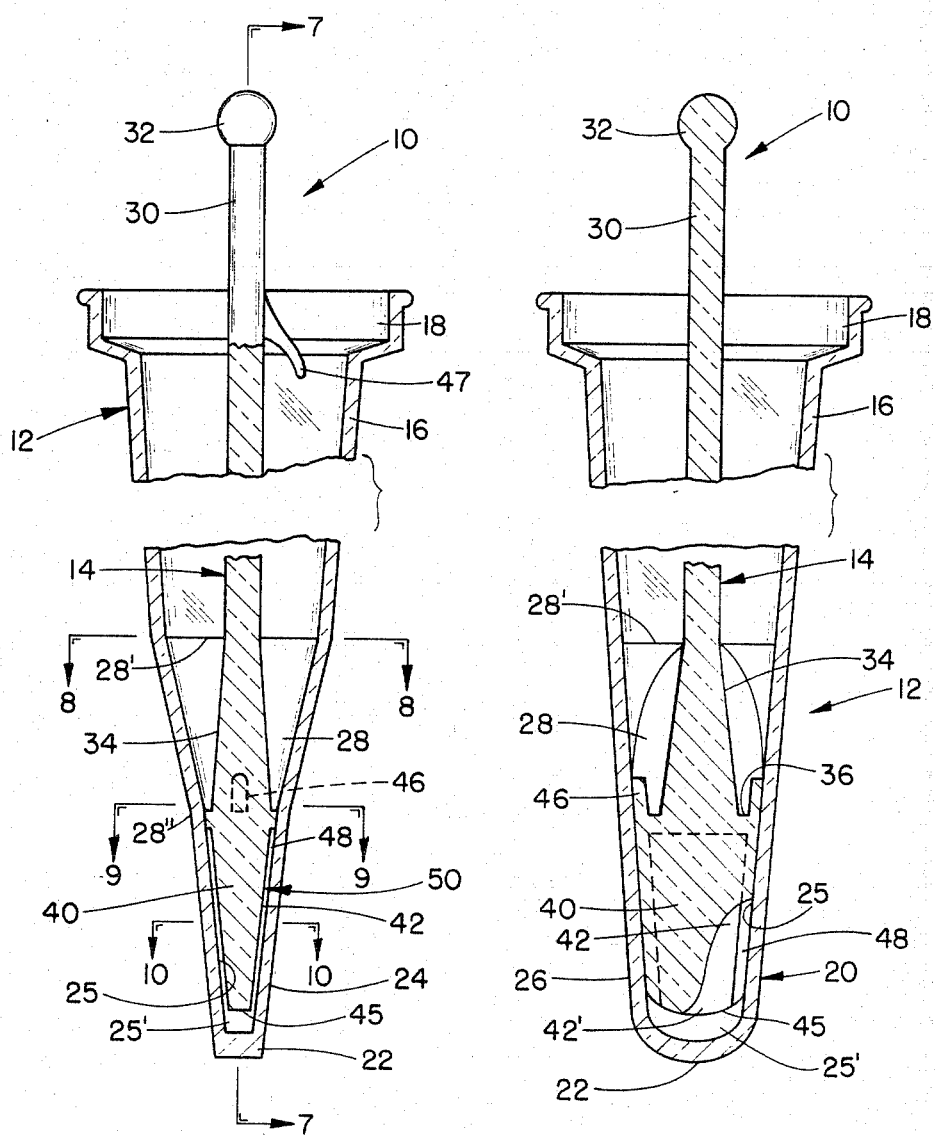
FIG. 6 is a vertical sectional view taken along line 6—6 of FIG. 5, parts being omitted.
FIG. 7 is a vertical sectional view taken along line 7—7 of FIG. 6.
Figure 8:
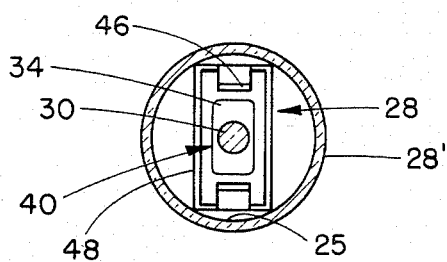
Figure 9:
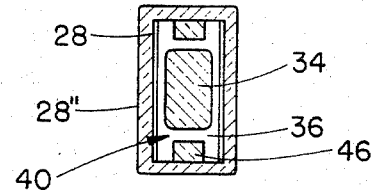
Figure 10:
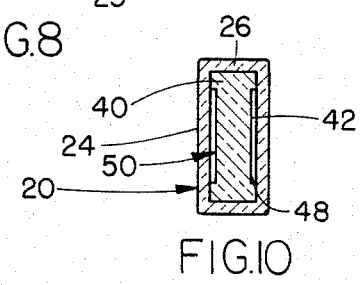
Figure 11:
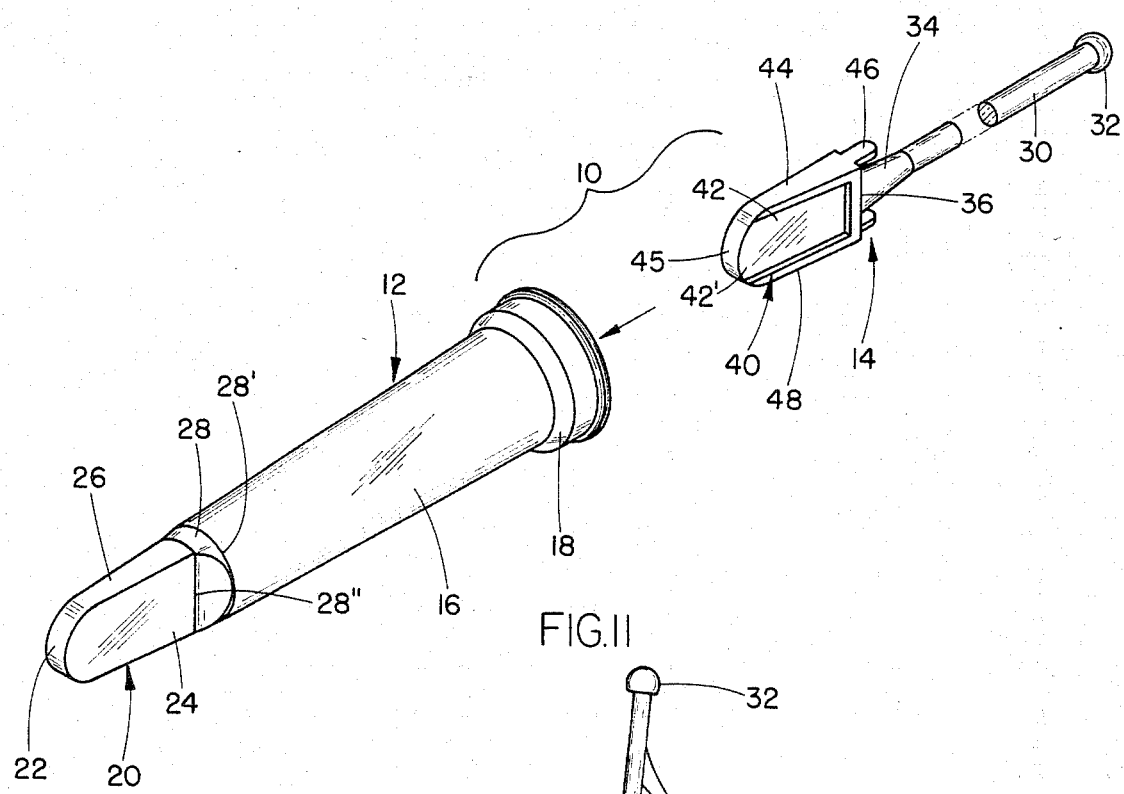
Figure 12:
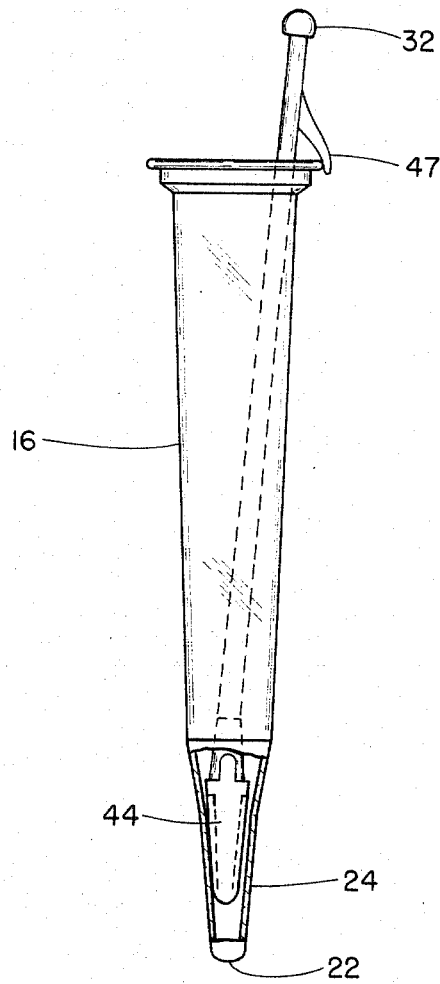

FIGS. 8, 9, and 10, are cross-sectional views taken along lines 8—8, 9—9, and 10—10 respectively of FIG. 6;

FIG. 11 is an exploded perspective view of parts of the assembly of apparatus embodying the invention; and FIG. 12 is a vertical section similar to FIG. 6 showing the stop clipped to the tube rim and the paddle insert partially entering the tube well.

Referring now to the drawings wherein like reference characters designate like or corresponding parts throughout, there is illustrated in FIGS. 5-11 an assembly of apparatus for collecting and microscopically examining a specimen, according to the invention. The assembly generally designated by reference numeral 10 includes a test tube 12 and a paddle insert 14. The test tube 12 as clearly shown in FIGS. 1, 2, 6, 7, and 11 has a frustoconical body 16. The wider end of the body 16 is integral with a cylindrical headed rim 18 at the open end of the tube 12. The other closed end of the tube 12 has a narrow tip 20. The closed end 22 of the tip 20 is cylindrically curved. The flat side walls 24 of the tip 20 are tapered and terminate at the closed bottom wall 22. The narrow end walls 26 of the tip 20 are also tapered. This arrangement defines a well 25 in the tip 20. The flat, opposite transparent, walls 24, 26 of the tube tip 20 are tapered. The closed wall 22 is thicker than the side walls 24, 26. The tube 12 is further formed with a short, tapered transition section 28 which is circular at its wider end 28' where it is integral with the conical body 16, and is generally rectangular at its narrow end 28" where it is integral with the tip 20; see FIGS. 6, 7, 8, and 9. The tapered tip 20 is rectangular in cross section, but of progressively smaller cross-sectional area down to the curved bottom wall 22; see FIGS. 10 and 11. The paddle insert 14 as best shown in FIGS. 3-11, has a long cylindrical handle 30 terminating at one end in a knob 32 to facilitate insertion of the paddle insert into the tube 12. The other end 34 of the handle 30 is flared downwardly and is integral with the upper or rear end wall 36 of a transparent paddle head 40 which has tapered, wide, flat walls 42 and tapered, narrow, flat walls 44 all substantially conforming in angualr disposition to the walls of the well 25 in the tip 20. The lower end 45 of the paddle head 40 is curved. The head 40 is shorter than the well 25 axially of the tube 12. When the paddle head is fully inserted into tube tip 20, the paddle head 40 terminates a short distance from the curved bottom wall 22 of the tube tip 20 to define a pocket 25' at the lower, closed end of the well 25; see FIGS. 6, 7. The handle 30 must be long enough so that when the paddle head 40 is fully inserted in the well 25, the knob 32 of the handle 30 will project out of the open end of the tube 12. The handle 30 extends axially out of the tube 12 when the head 40 is seated in the well 25.

A stop 47 projects outwardly from the handle 30 and is positioned thereon so that when the paddle head 40 is inserted into the tube 12 and the stop 47 is clipped to the top to the rim 18; the lower end 45 of the paddle 40 is spaced a predetermined distance from the bottom wall 22 of the tube tip 20, thereby insuring that a fixed volume of sediment and liquid is trapped between the insert 14 and the tube tip 20.

A pair of flexible fingers or projections 46 extends angularly and upwardly from end wall 36 of the paddle head 40. These projections are extensions of narrow tapered walls 44 of the head 40, and frictionally engage upper end portions of inner sides 26' of narrow tip walls 26. This contact between projections 46 and tip walls 26 prevents the paddle head from leaving the well 25 when the tube 12 is tipped or inverted.

Around the lateral or long side of the walls 42 and across their upper or rear ends are two inverted, rectangular, ridges 48. These ridges have flat outer sides. Each ridge 48 defines a shallow recess with the wall 42 and is closed by an adjacent inner side of the tip wall 24 to define a long, wide, but shallow chamber 50 in which a film of specimen to be examined may be received and retained; see FIGS. 6, and 10. The smooth lower end 42' of each wall 42 facilitates flowing of a speciment onto the wall 42 and between the wall 42 the ridges 48 and the adjacent tip wall 24. The ridges 48 insure that proper spacing is maintained between the walls 42 and the walls 24, and that the specimen is prevented from leaking upwardly or rearwardly of the tube tip 20 and the paddle head 40.

When the tube 12 is initially centrifuged, some sediment or casting is highly compacted in the pocket 25'. This will not prevent insertion of the paddle head into the tube wall because space is provided in the pocket 25' for the compacted material. The specimen which is being examined contains sediments and castings and is often lost in decanting in prior cylindrical test tubes, but is now retained within the tube tip 20. The insert 14 cannot accidentally slip out of the tube tip 20 before, during, and after microscopic examination of the specimen because of the frictionally gripping fingers 46.

In operation the test tube 12 will be approximately 75% filled with liquid such as urine sample located at the bottom end of the tube 12 and the well 25. Then the insert 14 will be inserted into the tube 12 with the stop 47 engaging the tube rim 18 thereby trapping a fixed volume in the well 25. The tube 12 will then be tilted to pour off all of the liquid and sediment not trapped in the well 25. As mentioned above, the insert 14 cannot slip out of the tube 12 because of the frictional grip. The tube 12 can be shaken to distribute the sediment in the liquid in the well 25 and then the insert stop 47 is disengaged from the rim 18 of the tube 12 and the insert 14 snugly inserted into well 25 thereby capturing a thin film of sediment and liquid on the walls of the paddle head on the body of the insert 14, i.e. between the insert and adjacent walls of the well which serve as transparent slides for the specimen. The test tube is then placed on a microscope for examination of the cast and sediment trapped on the walls of the paddle head.

The tube 12 and insert 14 may be made of inexpensive plastic material which may be discarded after use. The assembly insures safety and sanitation to medical technicians examining specimens of urine and other fluids which may be contaminated or diseased. The invention obtains better specimens for examination than has heretofore been possible by conventional means employing centrifuged test tubes to collect specimens and slides upon which specimens are deposited. The invention retains the collected specimens intact as contrasted by prior methods where the specimens are smeared when a slide is covered by a cover plate.

It should be understood that the foregoing relates to only a limited number of preferred embodiments of the invention which have been by way of example only, and that it is intended to cover all changes and modifications of the examples of the invention herein chosen for the purpose of the disclosure which do not constitute departures from the spirit and scope of the invention.

What is claimed is:

1. Apparatus for collecting and microscopically examining a specimen, comprising:
   a transparent tube having open and closed opposite ends in which tube a liquid may be centrifuged for concentrating constituents of said liquid to obtain a specimen for microscopic examination;
   said tube having a frustoconical body to receive said liquid;
   said tube having a tapered tip at its closed end in which said specimen may collect when said tube is centrifuged;
   said tip having opposed, tapered, wide, flat transparent side walls and opposed, tapered, narrow end walls and a curve bottom wall integral with said wide, flat walls to define a narrow, tapered wall in which said specimen is held while being examined microscopically;
   a paddle insert for supporting and retaining said specimen in said well while excess liquid is poured off from said tube, and while said specimen is being examined microscopically, said insert having an optically transparent paddle head, and a handle longer than the length of said tube, and integral with one end of said head to facilitate insertion of said paddle head into said well in said tube, said head being tapered to conform with said well and having ridges at lateral edges thereof and at said one end; and
   wherein said paddle head is axially shorter than said well, to provide a pocket between a free end of said head and said end wall of said tip wherein highly condensed and compressed constituents of said specimen can collect.

2. Apparatus as defined in claim 1, wherein said tube has a short tapered transition section integral with said body and tip, said section being circular at one end where it joins said body and generally rectangular at its other end where it joins said tip.

3. Apparatus as defined in claim 1, wherein said handle has a stop means adapted to engage said open end of said tube and prevent further insertion of said paddle head into said well.

4. Apparatus as defined in claim 3, wherein said head has opposed, tapered, flat other wide walls for disposition adjacent said wide walls of said tip, said head having opposed, tapered, other narrow walls for disposition adjacent said narrow walls of said tip.

5. Apparatus as defined in claim 4, wherein said ridges maintain a predetermined fixed close spacing between said wide walls of said tip and said other wide walls of said paddle head to define narrow chambers in which said specimen is received and retained while excess liquid is poured off and while said specimen is being microscopically examined.

6. Apparatus as defined in claim 5, wherein said paddle head has fingers extending away from said one end of said head at said other narrow walls of said head for frictionally engaging said narrow walls of said tip to retain said paddle head in said well when said tube is tipped or inverted.

7. Apparatus as defined in claim 6, wherein the end of said head between said ridges is smooth to permit said specimen to flow freely into said chambers while said wide walls of said tip close said chambers at said ridges.

* * * * *